(12) United States Patent
Chen et al.

(10) Patent No.: US 12,047,827 B2
(45) Date of Patent: Jul. 23, 2024

(54) INTERFERENCE RANDOMIZATION METHOD AND APPARATUS

(71) Applicant: HUAWEI TECHNOLOGIES CO., LTD., Shenzhen (CN)

(72) Inventors: Lei Chen, Chengdu (CN); Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 209 days.

(21) Appl. No.: 17/478,156

(22) Filed: Sep. 17, 2021

(65) Prior Publication Data
US 2022/0022113 A1    Jan. 20, 2022

Related U.S. Application Data

(63) Continuation of application No. PCT/CN2020/078318, filed on Mar. 7, 2020.

(30) Foreign Application Priority Data

Mar. 18, 2019    (CN) .......................... 201910204622.9

(51) Int. Cl.
*H04W 36/06*    (2009.01)
*H04W 36/14*    (2009.01)
(Continued)

(52) U.S. Cl.
CPC ........... *H04W 36/06* (2013.01); *H04W 36/14* (2013.01); *H04W 36/20* (2013.01); *H04W 36/26* (2013.01)

(58) Field of Classification Search
CPC ...... H04W 36/06; H04W 36/14; H04W 36/20
See application file for complete search history.

(56) References Cited

U.S. PATENT DOCUMENTS

2018/0234156 A1    8/2018 Tsai et al.
2019/0223201 A1*    7/2019 Lee ..................... H04L 5/0053
(Continued)

FOREIGN PATENT DOCUMENTS

CN    103326758 A    9/2013
CN    105792343 A    7/2016
(Continued)

OTHER PUBLICATIONS

European Search Report issued in corresponding European Application No. 20774033.3, dated Mar. 25, 2022, pp. 1-14.
(Continued)

*Primary Examiner* — Jackie Zuniga Abad
(74) *Attorney, Agent, or Firm* — HAUPTMAN HAM, LLP

(57) ABSTRACT

This application provides an interference randomization method and apparatus, to resolve a problem of continuous interference that may be caused by a configuration of a reference signal, especially a positioning reference signal, in a beam scenario. The method includes: A terminal device receives interference randomization configuration information, where the interference randomization configuration information includes configuration information in at least two time periods, receiving modes of a reference signal in the at least two time periods are different, and the receiving mode is used to indicate a receiving status of the terminal device for the reference signal on a reference signal resource or a reference signal resource set. The terminal device receives the reference signal based on the interference randomization configuration information.

20 Claims, 5 Drawing Sheets

(51) Int. Cl.
    *H04W 36/20*     (2009.01)
    *H04W 36/26*     (2009.01)

(56) References Cited

U.S. PATENT DOCUMENTS

| | | | | |
|---|---|---|---|---|
| 2020/0059286 A1* | 2/2020 | Xiong | ............... | H04W 48/16 |
| 2020/0107327 A1* | 4/2020 | Wang | ............... | H04W 72/044 |

FOREIGN PATENT DOCUMENTS

| | | | |
|---|---|---|---|
| CN | 108111282 | A | 6/2018 |
| CN | 108260158 | A | 7/2018 |
| CN | 108347766 | A | 7/2018 |
| CN | 108631891 | A | 10/2018 |
| CN | 108632984 | A | 10/2018 |
| EP | 3537798 | A1 | 9/2019 |
| WO | 2018137409 | A1 | 8/2018 |
| WO | 2018165018 | A1 | 9/2018 |

OTHER PUBLICATIONS

International Search Report issued in corresponding International Application No. PCT/CN2020/078318, dated May 27, 2020, pp. 1-8.
Chinese Office Action issued in corresponding Chinese Application No. 201910204622.9, dated Feb. 26, 2021, pp. 1-5.
Chinese Search Report issued in corresponding Chinese Application No. 201910204622.9, dated Feb. 17, 2021, pp. 1-2.
India Examination Report issued in corresponding India Application No. 202147043445, dated Mar. 31, 2022, pp. 1-7.

\* cited by examiner

First time period

Second time period

First time period

Second time period

INTERFERENCE RANDOMIZATION METHOD AND APPARATUS

CROSS-REFERENCE TO RELATED APPLICATIONS

This application is a continuation of International Application No. PCT/CN2020/078318, filed on Mar. 7, 2020, which claims priority to Chinese Patent Application No. 201910204622.9, filed on Mar. 18, 2019. The disclosures of the aforementioned applications are hereby incorporated by reference in their entireties.

TECHNICAL FIELD

This application relates to the communication field, and more specifically, to an interference randomization method and apparatus.

BACKGROUND

In mobile communication, usually, in a process of communicating with a network, user equipment (user equipment, UE) needs to measure and estimate a channel to determine resource allocation. The channel measurement is usually that the terminal measures a reference signal (reference signal, RS) sent by the network, or the network measures a reference signal sent by the terminal. Usually, the reference signal sent by the network has predefined pilot patterns of one or more types. For example, a positioning reference signal (positioning reference signal, PRS) has different pilot patterns of six types. Because there are a plurality of neighboring base stations in the network, patterns sent by the neighboring base stations may be the same. Consequently, reference signals sent by the neighboring base stations interfere with each other. For example, because the UE needs to receive and measure PRSs that are in a plurality of surrounding cells, when more than six cells need to be measured, pilots of the cells conflict, causing severe interference and affecting positioning performance.

In 5th generation (5th generation, 5G) mobile communication, in new radio (new radio, NR), beam-based wireless communication is used to improve efficiency of communication on a spectrum with a higher frequency. A density of base stations in an NR system is also higher than that in a conventional cellular network. Therefore, a quantity of base stations around UE is large. Consequently, reference signals sent by different base stations may interfere with each other due to factors such as beam use, a large quantity of reference beams sent by each base station, and channel environment uncertainty. In addition, different beam combinations of different base stations cause different interference situations. When the UE measures a reference signal sent by a base station, the reference signal may be continuously interfered by an interference signal sent by another base station, causing a measurement failure. Therefore, how to perform interference randomization in the NR system is an urgent problem to be resolved.

SUMMARY

In view of this, this application provides an interference randomization method and apparatus. Through beam rotation, beam switching, or beam muting, a reference signal is randomly sent in different time periods. This avoids continuous inter-beam interference generated due to fixed reference signal configurations.

According to a first aspect, an interference randomization method is provided, and includes: A terminal device receives interference randomization configuration information, where the interference randomization configuration information includes configuration information in at least two time periods, receiving modes of a reference signal in the at least two time periods are different, and the receiving mode is used to indicate a receiving status of the terminal device for the reference signal on a reference signal resource or a reference signal resource set. The terminal device receives the reference signal based on the interference randomization configuration information. According to the foregoing method, the terminal device may use different receiving modes in different time periods based on interference randomization configuration information, to avoid continuous interference to receive beams caused by using a same receiving mode in different time periods, and avoid an effect on reference signal received quality and channel estimation.

In a possible implementation of the first aspect, to determine a beam used to transmit a reference signal in each different time period, The interference randomization configuration information further includes an index of a start beam in a first time period and/or a receiving mode indication. Herein, reference signal configuration information in a time period is determined by using the index of the start beam in the first time period, and a receiving mode is determined by using the receiving mode indication, to determine a beam based on the receiving mode.

In a possible implementation of the first aspect, to reduce signaling overheads, beams do not need to be specified for all reference signals in each time period, and beam configuration may be performed by using an offset. Therefore, the interference randomization configuration information further includes a beam offset, and the beam offset is used to indicate an offset of a start beam in each of different time periods relative to the start beam in the first time period, or the beam offset is used to indicate an offset of a start beam in a subsequent time period relative to a start beam in a previous time period. The beam offset is used to calculate beams in each time period, and beams in one time period may be determined by using a start beam and an offset, so that signaling overheads are reduced.

In a possible implementation of the first aspect, another beam in a time period may be determined by using the start beam. Specifically, that a start beam of a group of beams in each time period is determined includes: The terminal device determines the start beam according to the following method:

$w_j = \mathrm{mod}(w_i + K_j, N)$, where $w_j$ is an index of a start beam in a $j^{th}$ time period, $w_i$ is an index of a start beam in an $i^{th}$ time period, $K_j$ is a beam offset of the $j^{th}$ time period relative to the $i^{th}$ time period, and N is a quantity of beams included in the group of beams, where i and j are nonnegative integers. According to the foregoing method, indexes or identifiers of all beams in a time period may be determined, beam resources may be determined based on the indexes or the identifiers of the beams, to receive reference signals.

According to a second aspect, an interference randomization method is provided, and is used by a network device to determine a reference signal transmitted in each time period, and send the reference signal in each time period, where the reference signals sent in time periods are different from each other. The method includes: The network device sends interference randomization configuration information to a terminal device, where the interference randomization configuration information includes configuration information in at least two time periods, receiving modes of a reference signal in the at least two time periods are different, and the receiving mode is used to indicate a receiving status of the terminal device for the reference signal on a group of beams. The network device sends the reference signal based on the interference randomization configuration information. According to the foregoing method, the network device enables a reference signal sent in each time period to be different, and indicates the interference randomization configuration information to the terminal, so that the terminal device can receive a reference signal on a corresponding beam by using a corresponding resource, thereby resolving a problem of continuous interference that is between reference signals and that may be caused by a fixed configuration.

In a possible implementation of the second aspect, to simplify configuration, a start beam and/or a receiving mode may be specified, so that information about a receiver and information about a sender in each time period is consistent. Therefore, the interference randomization configuration information further includes an index of a start beam in a first time period and/or a receiving mode indication. Herein, reference signal configuration information in a time period is determined by using the index of the start beam in the first time period, and a receiving mode is determined by using the receiving mode indication, to determine a beam based on the receiving mode.

In a possible implementation of the second aspect, to reduce signaling overheads, beams do not need to be specified for all reference signals in each time period, and beam configuration may be performed by using an offset. The interference randomization configuration information further includes a beam offset, and the beam offset is used to indicate an offset of a start beam in each of different time periods relative to the start beam in the first time period, or the beam offset is used to indicate an offset of a start beam in a subsequent time period relative to a start beam in a previous time period. The beam offset is used to calculate beams in each time period, and beams in one time period may be determined by using a start beam and an offset, so that signaling overheads are reduced.

In a possible implementation of the second aspect, another beam in a time period may be determined by using the start beam. Specifically, that a start beam of a group of beams in each time period is determined includes: The network device determines the start beam according to the following method:

$w_j = \mod(w_i + K_j, N)$, where $w_j$ is an index of a start beam in a $j^{th}$ time period, $w_i$ is an index of a start beam in an $i^{th}$ time period, $K_j$ is an offset of the start beam in the $j^{th}$ time period, and N is a quantity of beams included in the group of beams, where i and j are nonnegative integers. According to the foregoing method, indexes or identifiers of all beams in a time period may be determined, beam resources may be determined based on the indexes or the identifiers of the beams, to receive reference signals.

According to another aspect of this application, a terminal is provided. The terminal is configured to implement a function of the interference randomization method provided in any possible implementation of the first aspect. The function may be implemented by hardware, or may be implemented by hardware executing corresponding software. The hardware or the software includes one or more units corresponding to the foregoing function.

In a possible implementation, a structure of the terminal includes a processor, and the processor is configured to support the terminal in performing the interference randomization method provided in any one of the first aspect or the possible implementations of the first aspect. Optionally, the terminal may further include a memory and a communication interface. The memory stores code and data. The memory is coupled to the processor. The communication interface is coupled to the processor or the memory.

According to another aspect of this application, a network apparatus is provided. The network apparatus is configured to implement a function of the interference randomization method provided in the second aspect or any possible implementation of the second aspect. The function may be implemented by hardware, or may be implemented by hardware executing corresponding software. The hardware or the software includes one or more units corresponding to the foregoing function.

In a possible implementation, a structure of the network apparatus includes a processor, and the processor is configured to enable the network apparatus to perform the function of the interference randomization method provided in any one of the second aspect or the possible implementations of the second aspect. Optionally, the network apparatus may further include a memory and a communication interface. The memory stores code required for processing and/or by a baseband processor. The memory is coupled to the processor. The communication interface is coupled to the memory or the processor.

According to another aspect of this application, a computer-readable storage medium is provided. The computer-readable storage medium stores instructions. When the instructions are run on a computer, the computer is enabled to perform the interference randomization method provided in any one of the first aspect or the possible implementations of the first aspect, or perform the interference randomization method provided in any one of the second aspect or the possible implementations of the second aspect.

According to another aspect of this application, a computer program product including instructions is provided. When the computer program product runs on a computer, the computer is enabled to perform the interference randomization method provided in any one of the first aspect or the possible implementations of the first aspect, or perform the interference randomization method provided in any one of the second aspect or the possible implementations of the second aspect.

According to another aspect of this application, a communication system is provided. The communication system includes a plurality of devices, and the plurality of devices include a terminal and a network apparatus. The terminal is the terminal provided in the foregoing aspects, and is configured to support the terminal to perform the interference randomization method provided in any one of the first aspect or the possible implementations of the first aspect; and/or the network apparatus is the network device provided in the foregoing aspects, and is configured to support the network device to perform the interference randomization method provided in any one of the second aspect or the possible implementations of the second aspect.

According to another aspect of this application, an apparatus is provided. The apparatus is a processor, an integrated circuit, or a chip, and is configured to perform steps performed by a processing unit of a terminal in this embodiment of the present invention, for example, determine a start beam of the group of beams in each time period. The apparatus is further configured to perform processing or actions of the terminal that has been described in the foregoing other aspects or embodiments. Details are not described herein again.

According to another aspect of this application, another apparatus is provided. The apparatus is a processor, an integrated circuit, or a chip, and is configured to: perform steps performed by a processing unit of a network device in this embodiment of the present invention, support the network device in performing processing on various received or sent messages in the foregoing embodiments, and determine a start beam of the group of beams in each time period. The another apparatus is further configured to perform processing or actions of the terminal device described in the foregoing other aspects or embodiments. Details are not described herein again.

It may be understood that the interference randomization apparatus, the computer storage medium, or the computer program product provided above are all configured to perform the corresponding method provided above. Therefore, for beneficial effects that can be achieved by the apparatus, the computer storage medium, or the computer program product, refer to beneficial effects in the corresponding method provided above. Details are not described herein again.

DESCRIPTION OF EMBODIMENTS

Figure 1:
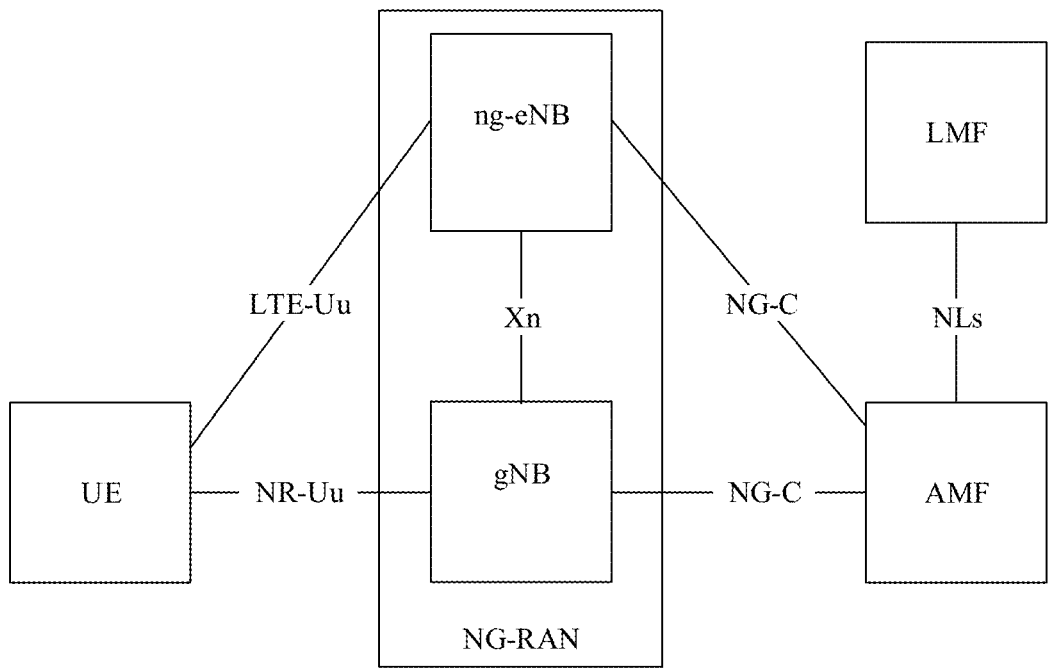
FIG. 1 is a schematic architectural diagram of a positioning system for positioning a terminal device according to an embodiment of this application.

The following describes the technical solutions in this application with reference to the accompanying drawings.

In embodiments of this application, "a plurality of" may be understood as "at least two"; and "a plurality of items" may be understood as "at least two items". The term "and/or" in this specification describes only an association relationship for describing associated objects and represents that there may be three relationships. For example, A and/or B may represent the following three cases: Only A exists, both A and B exist, and only B exists. In addition, the character "/" in this specification usually indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

The technical solutions of the embodiments of this application may be applied to various communication systems, for example, a code division multiple access (code division multiple access, CDMA) system, a wideband code division multiple access (wideband code division multiple access, WCDMA) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communication system, a future 5G system, or an NR system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A network device in the embodiments of this application may be a device configured to communicate with the terminal device. The network device may be a base transceiver station (base transceiver station, BTS) in a code division multiple access (code division multiple access, CDMA) system, a NodeB (NodeB, NB) in a wideband code division multiple access (wideband code division multiple access, WCDMA) system, an evolved NodeB (evolved NodeB, eNB or eNodeB) in an LTE system, or a radio controller in a cloud radio access network (cloud radio access network, CRAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). The operating system may be any one or more computer operating systems, for example, a Linux operating system, a Unix operating system, an Android operating system, an iOS operating system, or a Windows operating system, that implement service processing by using a process (process). The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

The following describes the technical solutions in the embodiments of the present invention with reference to the accompanying drawings in the embodiments of the present invention. Clearly, the described embodiments are merely some rather than all of the embodiments of the present invention. All other embodiments obtained by a person skilled in the art based on the embodiments of the present invention without creative efforts shall fall within the protection scope of the present invention.

It should be understood that names of all nodes and messages in this application are merely names specified for ease of description in this application, and may be different names in an actual network. It should not be understood that names of various nodes and messages are limited in this application. On the contrary, any name that has a same or similar function as that of a node or a message used in this application is considered as that in a method or an equivalent replacement in this application, and is within the protection scope of this application. Details are not described below.

This application mainly uses a positioning reference signal and a positioning system as main description objects. However, the method in this embodiment of this application should not be understood as being limited to only a positioning system, and may also be used for interference randomization of another reference signal. Details are not described below again.

FIG. 1 is a schematic architectural diagram of a positioning system for positioning a terminal device according to an embodiment of this application. As shown in FIG. 1, in the positioning system, UE is connected to a radio access network via a next-generation eNodeB (next-generation eNodeB, ng-eNB) through an LTE-Uu interface and/or via a gNB through an NR-Uu interface. The radio access network is connected to a core network via an access and mobility management function (access and mobility management function, AMF) through an NG-C interface. A next-generation radio access network (next-generation radio access network, NG-RAN) includes one or more ng-eNBs. The NG-RAN may alternatively include one or more gNBs. The NG-RAN may alternatively include one or more ng-eNBs and gNBs.

In FIG. 1, the ng-eNB is an LTE base station that accesses a 5G core network, and the gNB is a 5G base station that accesses the 5G core network. The core network includes functions such as an AMF and a location management function (location management function, LMF). The AMF is configured to implement functions such as access management, and the LMF is configured to implement functions such as positioning. The AMF and LMF are connected through an NLs interface. The LMF is an apparatus or a component deployed in the core network to provide a positioning function for the UE.

Figure 2:
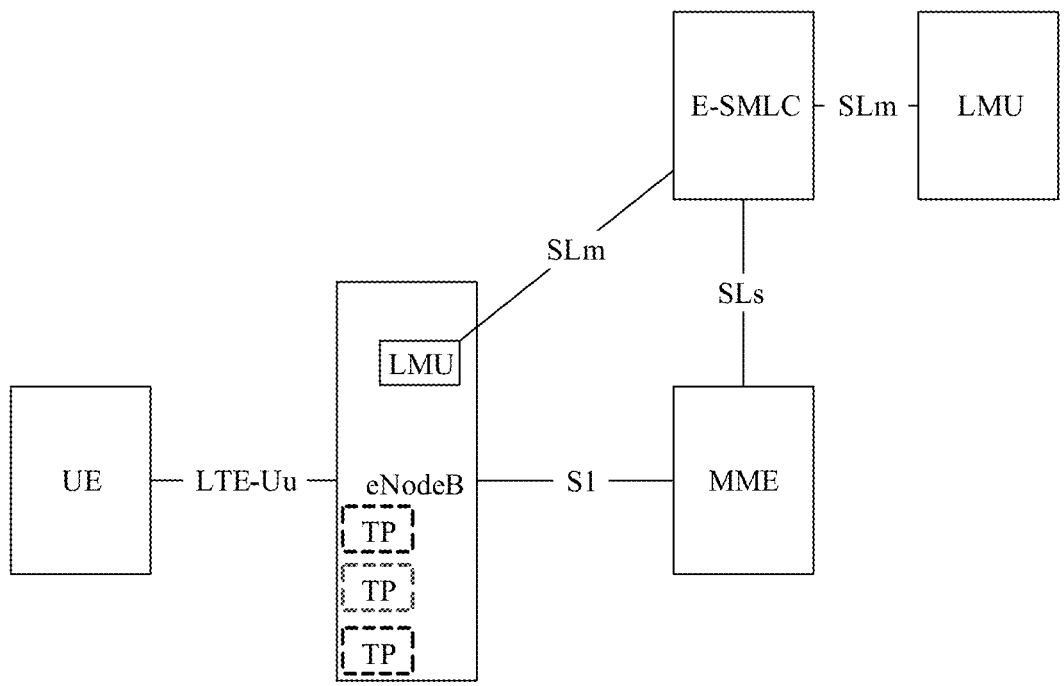
FIG. 2 is a schematic architectural diagram of another positioning system for positioning a terminal device according to an embodiment of this application.

FIG. 2 is a schematic architectural diagram of another positioning system for positioning a terminal device according to an embodiment of this application. A difference between an architecture of the positioning system in FIG. 1 and that in FIG. 2 lies in that an apparatus or a component (for example, an LMF) of a location management function in FIG. 1 is deployed in a core network, and a part of apparatuses or components (for example, a location management component (location management component, LMC) or a location measurement unit (location measurement unit, LMU)) of a location management function in FIG. 2 may be deployed in a base station, or may be separated from the base station. As shown in FIG. 2, a gNB includes an LMU. The LMU is a functional component part of the LMF, may be integrated in the gNB, or may be independently deployed. The LMU is connected to an evolved serving mobile location center (evolved serving mobile location center, E-SMLC) through an SLm interface.

In this embodiment of this application, a location function node (for example, the E-SMLC or the LMF) collects measurement information and location information that are reported by the base station and/or UE, to determine a location of the UE.

It should be understood that the positioning system in FIG. 1 or FIG. 2 may include one or more gNBs and one or more UEs. One gNB may transmit data or control signaling to one or more UEs. A plurality of gNBs may also transmit data or control signaling to one UE.

It should be further understood that a device or a function node included in the positioning system in FIG. 1 or FIG. 2 is merely described as an example, and does not constitute a limitation on this embodiment of this application. In practice, the positioning system in FIG. 1 or FIG. 2 may further include another network element or device or function node that has an interaction relationship with the device or function node shown in the figure. This is not specifically limited herein.

For ease of understanding, the following briefly describes some terms or concepts in the embodiments of this application.

Quasi-co-location (quasi-co-location, QCL) may also be referred to as quasi-colocation. A quasi-colocation relationship is used to indicate that a plurality of resources have one or more same or similar communication features. For the plurality of resources that have the quasi-colocation relationship, same or similar communication configuration may be used. For example, if two antenna ports have the co-location relationship, large-scale information of a channel on which a symbol on one port is transmitted can be inferred from large-scale information of a channel on which a symbol on the other port is transmitted. For example, that an antenna port of a synchronization signal/physical broadcast channel block (synchronization signal/physical broadcast channel block, SS/PBCH block) and an antenna port of a physical downlink control channel (physical downlink control channel, PDCCH) demodulation reference signal (demodulation reference signal, DMRS) are QCLed on a spatial receive parameter means that a spatial receive parameter, to be specific, a receive beam direction, used when the PDCCH DMRS is received can be inferred from a spatial receive parameter, to be specific, a receive beam direction, used when UE receives the SS/PBCH block. In other words, the UE may receive the PDCCH DMRS based on an optimal receive beam trained by the SS/PBCH block.

That two reference signals are QCLed on a large-scale parameter means that any antenna port on the first reference signal and any antenna port on the second reference signal are QCLed on the large-scale parameter.

A beam (beam) is a communication resource. The beam may be a wide beam, a narrow beam, or another type of beam. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent on different beams. Optionally, a plurality of beams having a same communication feature or similar communication features may be considered as one beam. One beam may include one or more antenna ports, configured to transmit a data channel, a control channel, a sounding signal, and the like. For example, a transmit beam may be signal strength distribution formed in different directions in space after a signal is transmitted by using an antenna, and a receive beam may be signal strength distribution, in different directions in space, of a radio signal received from an antenna. It can be understood that the one or more antenna ports forming the beam may alternatively be considered as one antenna port set. In a protocol, the beam can also be embodied as a spatial filter (spatial filter).

A serving base station is a base station on which a terminal device camps or to which the terminal device establishes a connection. The terminal device may implement a network connection and obtain a network service via the serving base station. The terminal device may have a plurality of serving base stations. When there are the plurality of serving base stations, there is one primary cell (primary cell). A cell corresponding to the serving base station is referred to as a serving cell.

A neighboring base station is a base station that can be detected by the terminal device and is potentially referred to as the serving base station of the terminal device. Usually, the neighboring base station is a neighboring node of the serving base station, and the neighboring node and the serving base station may be physically adjacent, or may not be physically adjacent. In a positioning system, the neighboring base station and the serving base station may send a positioning reference signal to the terminal device or receive the positioning reference signal from the terminal device. A cell corresponding to the neighboring base station is referred to as a neighboring cell.

In an LTE system, PRSs of a cell are considered to be sent omnidirectionally, and an interference caused by the PRSs is similar to coverage of the cell. In an NR high-frequency-band system, PRSs are no longer omnidirectionally sent. An interference range and interference object corresponding to each PRS are no longer equal to a coverage of the cell. Therefore, an impact of beams does not need to be considered for the PRSs in mute mode. In addition, interference caused by a PRS sent by using a beam is random, and only time and frequency domains are considered for interference avoidance in LTE. It should be understood that the PRS is merely used as an example herein. The reference signal includes but is not limited to a CSI-RS, a tracking reference signal (tracking reference signal, TRS), a synchronization signal block (synchronization signal block, SSB), a DMRS, and a PRS. Details are not described below again.

To resolve the foregoing problem, an interference randomization method is used in this embodiment. The method includes: A terminal device receives interference randomization configuration information, where the interference randomization configuration information includes configuration information in at least two time periods, receiving modes of a reference signal in the at least two time periods are different, and the receiving mode is used to indicate a receiving status of the terminal device for the reference signal on a group of beams. The terminal device receives the reference signal based on the interference randomization configuration information.

The interference randomization configuration information further includes an index of a start beam in a first time period and/or a receiving mode indication.

Further, the interference randomization configuration information further includes a beam offset, and the beam offset is used to indicate an offset of a start beam in each of different time periods relative to the start beam in the first time period, or the beam offset is used to indicate an offset of a start beam in a subsequent time period relative to a start beam in a previous time period.

For ease of description and understanding of the method in the embodiments of this application, the following describes a relationship between a reference signal, a reference signal resource, and a beam.

A reference signal is also referred to as a pilot, and is a known signal provided by a transmit end to a receive end for channel estimation or channel sounding. The known signal refers to a signal whose sequence is known, and the signal may be predefined. Specifically, in wireless communication, a sequence may be determined by using an index or a sequence generation parameter (for example, a random number). In this application, a configuration parameter for determining a reference signal is referred to as a reference signal parameter, for example, an index or a sequence generation parameter.

A reference signal resource is a time-frequency resource used to transmit a reference signal, and the reference signal sequence is usually modulated to a predetermined time-frequency resource for transmission. A time-frequency resource on which the reference signal is transmitted may be configured or predefined by a system.

A beam is a communication resource for data transmission of a reference signal in one space. One or more reference signals may be transmitted in one space, and a plurality of time-frequency resources may be configured on one beam to transmit a reference signal, or a plurality of different reference signals may be transmitted in a time division manner on one time-frequency resource of one beam.

To meet coverage, a base station needs to transmit one or more beams in different directions. In NR, to implement better transmission performance, beam-based transmission is widely applied. A terminal device may receive reference signals or signals from different beams.

When configuring a reference signal for the terminal device, the base station usually specifies a mapping relationship between a reference signal and a reference signal resource. A terminal device that can receive a plurality of beams usually needs to attempt to receive a reference signal on all possible beams.

Figure 3:
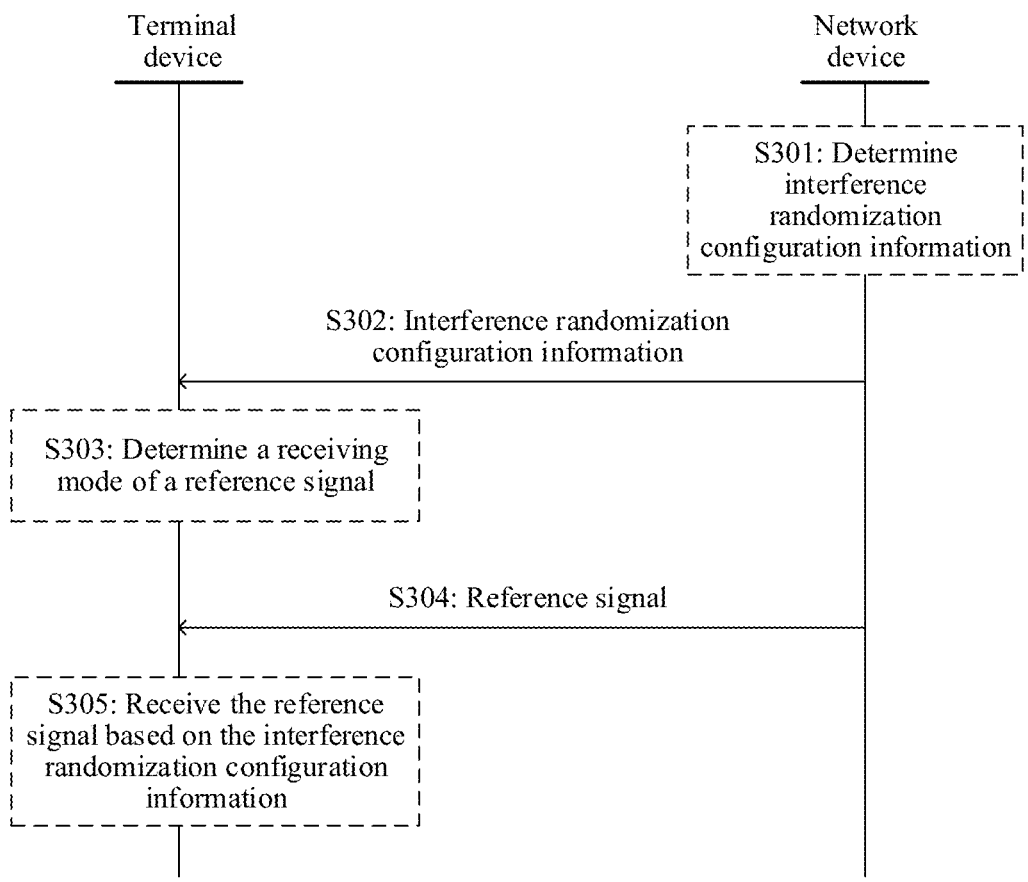
FIG. 3 is a flowchart of interference randomization configuration according to an embodiment of this application.

FIG. 3 is a flowchart of interference randomization configuration according to an embodiment of this application. A network device may be an LMF, or may be a serving base station. In the distributed positioning architecture shown in FIG. 2, a location management function may be partially located in a radio access network (radio access network, RAN), and is usually integrated with a base station. The embodiment in FIG. 3 includes the following steps.

S301: The network device determines interference randomization configuration information.

The LMF or the serving base station determines the interference randomization configuration information. The interference randomization configuration information may depend on cells participating in positioning. Therefore, the network device may need to obtain reference signal information of each cell. The network device determines the interference randomization configuration information based on the obtained reference signal information. In a positioning system, a reference signal may be a PRS or any other reference signal. This is not limited in this application. In this application, the PRS is mainly used for description, but the PRS does not constitute a limitation on the embodiments of this application.

It should be understood that the interference randomization configuration information may be a part of a message, for example, positioning assistance information. The interference randomization configuration information herein may not represent an actual message name or constitute a limitation on the message name. The interference randomization configuration information may not be an entity message, either. Details are not described again below.

Specifically, the reference signal information includes a reference signal parameter, a transmission periodicity, a transmission density, a time-frequency resource, and the like. The reference signal parameter is described above, and details are not described again.

In a possible implementation, a neighboring base station may obtain a downlink reference signal measurement result of the terminal device from the serving base station, and the neighboring base station determines PRS information based on the downlink reference signal measurement result of the terminal device. After determining the PRS information, the serving base station and/or the neighboring base station may send the PRS information to the network device (for example, the LMF) through an NR positioning protocol annex (NR positioning protocol annex, NRPPa) or an LTE positioning protocol annex (LTE positioning protocol annex, LPPa).

Specifically, the serving base station and/or the neighboring base station send/sends the PRS information to the LMF at a request of the LMF. If an LMC is deployed on a RAN side, the serving base station and/or the neighboring base station send/sends the PRS information to the LMC at a request of the LMC.

The PRS information further includes at least one of a reference signal resource of a cell in which the base station is located, a reference signal measurement result of the cell in which the base station is located, a reference signal resource corresponding to a potential interfering cell, or a reference signal measurement result of the potential interfering cell. The reference signal resource may be a reference signal index of a reference signal, and the measurement result may be a reference signal received power (reference signal received power, RSRP) or a signal to interference plus noise ratio (signal to interference plus noise ratio, SINR).

The interference randomization configuration information includes configuration information in at least two time periods, receiving modes of a reference signal in the at least two time periods are different, and the receiving mode is used to indicate a receiving status of the terminal device for the reference signal on a reference signal resource or a reference signal resource set.

One or more reference signals may be configured for one terminal device. The terminal device usually receives the reference signal based on a configuration of the network device. The configured reference signal may be transmitted on one or more beams. Transmission or reception of the reference signal performed based on reference signal configuration information is usually determined. Once two reference signals interfere with each other, such interference may persist. To avoid such persistent interference, a dynamic method can be used to implement interference randomization.

For ease of differentiation, in this application, dynamic transmission of a group of reference signals on a corresponding group of different beams is referred to as beam rotation, and transmission of a reference signal on different beams in a time division manner is referred to as beam switching. The dynamic transmission of the group of reference signals on the different beams can ensure that each beam may correspond to one reference signal and one reference signal resource at each reference signal transmission moment. The transmission of the reference signal on the different beams in the time division manner means that at least one beam has no reference signal resource to transmit the reference signal at a moment. Therefore, a receive end may need to adjust receive beams to receive the reference signal, that is, beam switching exists.

It should be understood that beam rotation and beam switching are used herein only for ease of description. From a perspective of a reference signal or a reference signal resource, in some configurations, beam switching may also be beam rotation.

Usually, to avoid interference, time-frequency resources of different reference signals are different. The time-frequency resources of the different reference signals are referred to as a reference signal resource set. The network device may configure a correspondence between a resource in the reference signal resource set and a reference signal. To describe a relationship between a beam and a reference signal, configuration is usually performed by using QCL, that is, a reference signal is configured to have a QCL relationship with another reference signal. The terminal may obtain a receiving direction or a sending direction of a reference signal by using the QCL relationship.

The interference randomization configuration information further includes an index of a start beam in a first time period and a receiving mode indication.

A start beam is a beam that is first sent or received in a time period, for example, the first time period. An index of the start beam may be an index or an identifier (identifier, ID) of a reference signal. It is assumed that there are four beams, and beam IDs are B0, B1, B2, and B3 in sequence. In a time period, a start beam may be one of the beams B0 to B3. It should be understood that a start beam in a time period is not necessarily sent on a reference signal resource 0. In other words, the start beam does not need to correspond to a beam on a reference signal resource 0 in a reference signal resource set.

The network device may configure a beam set for a reference signal set, and a beam index may be a location index of a beam in the beam set or an identifier of the beam, or may be a location index of a QCL indication reference signal in the QCL reference signal set or an identifier of the reference signal. The beam index may alternatively indicate a beam (or a QCL indication reference signal) corresponding to an index or an identifier in the reference signal set. For example, a beam index 0 may indicate a beam corresponding to the 0th reference signal in the reference signal configuration information, and a beam index 2 may indicate a beam corresponding to the second reference signal in the reference signals. Alternatively, a beam index 0 may indicate a beam (or a QCL indication reference signal) corresponding to a reference signal ID 0 in the configuration information, and a beam index 2 may indicate a beam (or a QCL indication reference signal) corresponding to a reference signal ID 2 in the configuration information. Different beams in this application may be represented by different beam indexes, or may be represented by different QCL indication reference signal indexes or reference signals.

The receiving mode includes one of a rotation mode, a mute mode, or a switching mode. The rotation mode means that reference signals are sent in a beam rotation manner. The mute mode means that a reference signal transmitted on some reference signal resources or at least one of a plurality of reference signals transmitted on one reference signal resource is in a mute state in a time period. The switching mode means that a reference signal is sent in a beam switching manner. The receiving mode indication is used to indicate that the receiving mode is one of the foregoing three modes. Coding of a specific indication message is not limited in this application. For example, two bits may be used for indication.

It should be understood that the receiving mode is for the terminal device. From a perspective of receiving the reference signal by the terminal device, the terminal device receives the reference signal in a corresponding receiving mode. For the network device, the receiving mode is a sending mode, and the sending mode and the receiving mode are only from perspectives of different network elements. For an uplink reference signal, the terminal is in a sending mode, and the network device is in a receiving mode. For a downlink reference signal, the receiving mode is used only for ease of unified description in this application, which does not mean that receiving is also performed from a perspective of the network device. Therefore, for the downlink reference signal, the receiving mode may be understood as a sending mode from a perspective of the network device. Details are not described herein again. The following mainly uses the downlink reference signal as an example for description.

The interference randomization configuration information further includes a beam offset, and the beam offset is used to indicate an offset of a start beam (or beam index) in each of different time periods relative to the start beam (or a beam index) in the first time period, or the beam offset is used to indicate an offset of a start beam (or a beam index) in a subsequent time period relative to a start beam (or a beam index) in a previous time period. A specific solution will be described in a subsequent embodiment.

After obtaining positioning reference signal information of the serving base station and/or the neighboring base station, the network device may directly configure interference randomization configuration information of each cell. Alternatively, the network device may send reference signal information of a neighboring base station of each base station to each base station, and each base station determines interference randomization configuration information based on the reference signal information of the neighboring base station, and sends the determined interference randomization configuration information to the network device. A specific implementation is not limited in this application.

The network device or each base station determines the interference randomization configuration information mainly by monitoring a conflict of reference signals based on reference signal resource configuration information. When the conflict occurs, an objective is to reduce the conflict. The conflict of the reference signal may be detected and the interference randomization configuration information may be determined in various methods. A specific determining method is not limited in this application.

S302: The network device sends the interference randomization configuration information to the terminal device.

After determining the interference randomization configuration information, the network device sends the interference randomization configuration information to the terminal device. The interference randomization configuration information may be included in the reference signal configuration information, or may be separately sent. The reference signal configuration information may include reference signal information, and the reference signal information includes reference signal information of a serving cell and a neighboring cell. If the interference randomization configuration information is separately sent, the network device may further send the reference signal configuration information to the terminal device, to configure the reference signal.

It should be understood that, in this application, the reference signal configuration information and/or the interference randomization configuration information are/is merely a name, and may not be an entity message. The reference signal configuration information and the interference randomization configuration information used in this application do not constitute a limitation on a message name, and may also be another message, for example, positioning assistance information. The reference signal configuration information and the interference randomization configuration information may be sent in one message, or may be sent in different messages. This is not limited in this application.

When the network device is the LMF, the LMF sends the reference signal configuration information to the terminal device through an NR positioning protocol (NR positioning protocol, NRPP) or an LTE positioning protocol annex (LTE positioning protocol, LPP).

When the network device is the serving base station, the interference randomization configuration information may be sent to the terminal device by using an RRC message.

A protocol for specifically sending the interference randomization configuration information is not limited in this application. The interference randomization configuration information is described above, and details are not described again.

Optionally, after receiving the interference randomization configuration information, the terminal device may send a response message to the network device, to indicate that the terminal device receives the interference randomization configuration information.

S303: The terminal device determines the receiving mode of the reference signal.

The terminal device receives the interference randomization configuration information, where the interference randomization configuration information includes the receiving mode of the reference signal, and may further include other information such as a beam offset. The terminal device determines the index of the start beam based on the receiving mode of the reference signal and/or the beam offset and the reference signal information.

After determining the foregoing information, the terminal device receives the reference signal based on the foregoing information.

S304: The network device sends the reference signal to the terminal device.

The network device sends the reference signal to the terminal device. The reference signal is sent on a configured resource. The configured resource is a reference signal resource configured in the reference signal configuration information, and includes, for example, a reference signal parameter, a transmission periodicity, a transmission density, a time-frequency resource, and the like.

Specifically, the network device may send the reference signal by using one of beam rotation mode, a mute mode, or a beam switching mode. Indexes of start beams in different time periods are different in different modes. The terminal device receives the reference signal.

S305: The terminal device receives the reference signal based on the reference signal configuration information.

The terminal device receives the reference signal in the receiving mode determined based on the reference signal configuration information. Specifically, the reference signal is received based on the reference signal information and the indexes that are of the start beams in the different time periods and that are determined based on the reference signal configuration information. The reference signal information includes a resource for reference signal transmission, in other words, a time-frequency resource for reference signal transmission, or may include a space resource for reference signal transmission. The space resource for reference signal transmission is mainly carried by using a beam.

According to the foregoing embodiment, the interference randomization configuration information may be transmitted between the network device and the base station, so that a transmit end and a receive end send and receive the reference signal in a specific mode, and the reference signal changes in a transmission direction of each beam. Therefore, continuous interference in a direction is avoided, reliability of reference signal measurement is improved, and accuracy of positioning measurement is facilitated.

Figure 4:
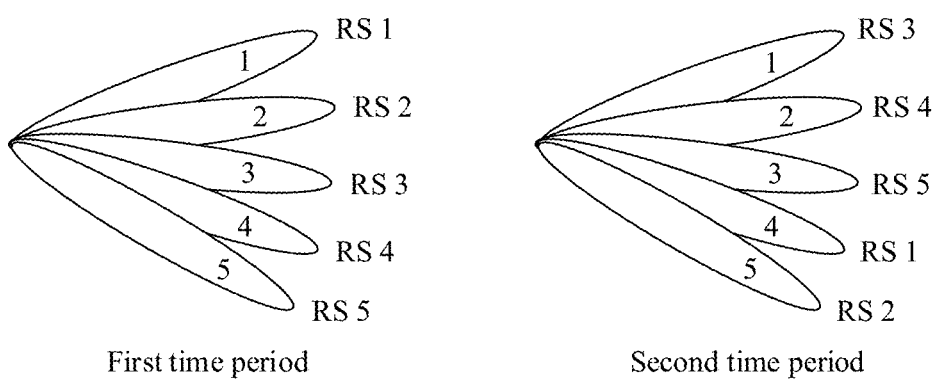
FIG. 4 shows an interference randomization method performed in a beam rotation mode according to an embodiment of this application.

FIG. 4 shows an interference randomization method performed in a beam rotation mode according to an embodiment of this application. FIG. 4 shows a correspondence between a beam and a reference signal in two time periods. Numbers 1, 2, 3, 4, and 5 on each beam respectively represent an index of a beam, and an RS 1, an RS 2, an RS 3, an RS 4, and an RS 5 respectively represent a number of a reference signal. Each reference signal corresponds to a time-frequency resource. A specific time-frequency resource and a reference signal are usually configured by a system. This is not limited in this application.

It is assumed that in a first time period, the RS 1 is transmitted on a beam 1, the RS 2 is transmitted on a beam 2, the RS 3 is transmitted on a beam 3, the RS 4 is transmitted on a beam 4, and the RS 5 is transmitted on a beam 5. Because beam rotation is used, in a second time period, the RS 3 is transmitted on the beam 1, the RS 4 is transmitted on the beam 2, the RS 5 is transmitted on the beam 3, the RS 1 is transmitted on the beam 4, and the RS 2 is transmitted on the beam 5. Because a beam is a communication resource for data transmission in space, a transmitted reference signal actually changes on the beam. Assuming that a resource is unchanged, it appears that beams on different reference signal resources change.

A network device may configure a PRS resource set for a terminal device, and indicate a correspondence between a PRS resource set and a beam to the terminal device, to implement beam rotation. Usually, the correspondence between a PRS resource set and a beam may be indicated by using a QCL, indicating that the terminal device may receive a PRS signal by using a receive beam of a QCLed reference signal. The reference signal may be a PRS, an SSB, a CSI-RS, or the like. To achieve beam rotation, the correspondence between a PRS resource set and a beam needs to be configured in different time periods.

To implement PRS beam rotation, the network device needs to configure at least one of the following information: periodicity information of beam rotation, time period information of beam rotation, beam information of beam rotation, and a beam offset. The periodicity information of beam rotation is used to indicate a periodicity of a time period. One periodicity may include a plurality of time periods, or different time periods may correspond to different periodicities. The time period information of beam rotation includes a start location and time length information of a time period, where the time length information may be one or more symbols, one or more slots, one or more subframes, or the like. This application imposes no limitation on which one of the symbol, the slot, or the subframe is specifically used as a time length unit.

Through such beam rotation, a reference signal on each beam may change with time, thereby avoiding continuous interference caused by a conflict of reference signals. Therefore, interference randomization can be implemented, and transmission performance can be improved.

To implement beam rotation, a correspondence between a beam and a reference signal needs to be configured in different time periods. There may be a plurality of methods to implement the configuration.

Figure 5:
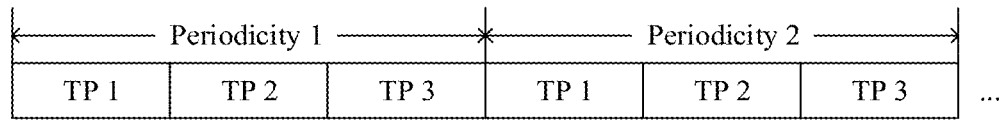
FIG. 5 shows a method for configuring a correspondence between a beam and a reference signal in different time periods according to an embodiment of this application.

FIG. 5 shows a method for configuring a correspondence between a beam and a reference signal in different time periods according to an embodiment of this application. In FIG. 5, three time periods (time period, TP) are used as an example. The three TPs are a TP 1, a TP 2, and a TP 3, and every three time periods form one periodicity. FIG. 5 shows two periodicities. A reference signal is transmitted on a symbol level, and may be transmitted on consecutive symbols. Therefore, a time period may be one or more symbols, one or more slots, or one or more subframes, and a length of each time period may be separately configured, or may be together configured by a protocol or a network. A specific length of the time period is not limited in this application.

Figure 6:
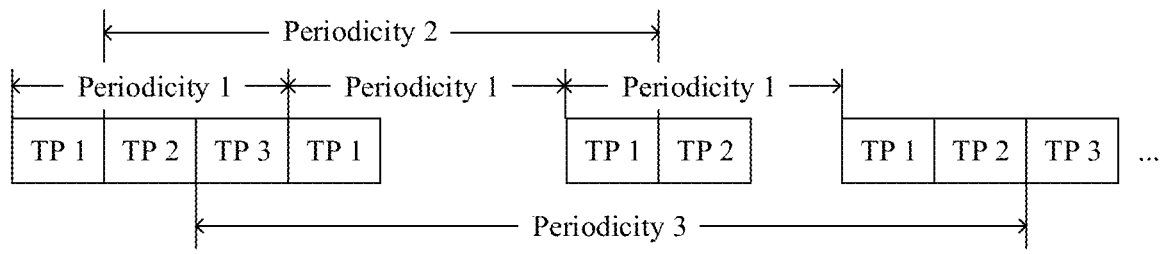
FIG. 6 shows a method for configuring different time periods by using different periodicities according to an embodiment of this application.

If the length of each time period is different, the configuration is relatively complex. To simplify the configuration, a plurality of cross periodicities can be used for configuration. FIG. 6 shows a possible configuration method of a plurality of different periodicities. FIG. 6 includes configurations of time periods in three periodicities. A periodicity in a TP 1 is a periodicity 1, a periodicity in a TP 2 is a periodicity 2, and a periodicity in a TP 3 is a periodicity 3. It can be learned that periodicities of the three time periods are different, to be specific, reference signal configuration densities of the three different time periods are different. Sizes of the three time periods may be one or more symbols, one or more slots, or one or more subframes. A length of each time period may be separately configured, or may be together configured by a protocol or a network. A specific length of the time period is not limited in this application.

If a plurality of periodicities are configured in a system, or a plurality of reference signals with different periodicity lengths may be configured according to a protocol, beam rotation is performed in time periods in different periodicities. For example, an RS 1 corresponds to a beam 1 in the periodicity 1, and corresponds to a beam 3 in the periodicity 2.

If a system configures a periodicity to include a plurality of time periods, or that a plurality of time periods can be configured in a periodicity is defined in a protocol, beam rotation is performed in different time periods in the periodicity. As shown in FIG. 4, in the periodicity 1, the RS 1 corresponds to the beam 1 on the TP 1 and the beam 3 on the TP 2. In the periodicity 2, the TP 1 also corresponds to the beam 1 in the TP 1 and the beam 3 in the TP 2.

To implement beam rotation, start beams in different time periods may be specified. The start beam may be specifically indicated by using an index or identifier of a beam, or by using a QCL.

Specifically, in a possible implementation, the network device configures, for the terminal device, an index or an identifier of a start beam in each time period, or QCL information. Time period information of beam rotation may be indicated by using a system frame number, a slot number, a symbol, or the like, or may be indicated by using a combination of a system frame number, a slot number, and a symbol. For example, a configuration in a TP 0 in FIG. 5 may be determined according to mod(SFN, 3)=0, where an SFN is a system frame number, and mod represents modulo. That is, a frame that exists when a result obtained by the system frame number mod 3 is 0 corresponds to a TP 0. Similarly, the TP 1 may be determined according to mod (SFN, 3)=1.

Further, the time period information of beam rotation may be determined by using the system frame number and the slot number, and a start slot of a time period is indicated by using a specified slot number. Specifically, the time period information of beam rotation may also be determined in a similar modulo operation manner. A specific method is not described in detail again. The time period information of beam rotation may be further indicated by using the symbol, and different symbols correspond to different time periods.

In a possible implementation, start beams in different time periods may be indicated by using a beam offset. The network device configures only an index of a start beam of the terminal device in a first time period, and a start beam in a subsequent time period may be determined by using the beam offset.

Specifically, the beam offset may be implemented according to two methods. In a first method, the beam offset is used to indicate an offset of a start beam in each of different time periods relative to the start beam in the first time period. In a second method, the beam offset is used to indicate an offset of a start beam in a subsequent time period relative to a start beam in a previous time period.

In the first method, an offset of each time period is configured relative to the start beam in the first time period. The first time period herein refers to an initial time period in a periodicity, or a time period of an initial periodicity in time periods of a plurality of pieces of periodicities. It should be understood that the first herein may also start from a number 0. Herein, we use 1 as an example, but this is not limited. In this application, 1 is used as a start number, and details are not described herein again.

For example, in FIG. 5, a periodicity includes three time periods. It is assumed that there are three beams. Because the TP 1 is the first time period, a start beam is configured. It is assumed that an index of the start beam is 1. A start beam in the TP 2 may be indicated by using an offset. Assuming that a beam offset in the TP 2 is 2, an index of the start beam in the TP 2 is a sum of the index of the start beam in the TP 1 and the beam offset. Therefore, the index of the start beam in the TP 2 is obtained as 3, and corresponds to a beam 3. For the TP 3, assuming that a beam offset in the TP 3 is 4, an index of a start beam in the TP 3 is a sum of the index 1 of the start beam in the TP 1 and the beam offset 4. Therefore, the index of the start beam in the TP 3 is obtained as 5. Because the index 5 of the start beam exceeds a maximum beam index, the index of the beam may be obtained as 2 according to mod(5, 3)=2, where mod indicates a modulo operation.

In the second method, the offset may also be configured relative to the start beam in the previous time period. Similarly, in FIG. 5, a periodicity includes three time periods. For example, it is assumed that there are three beams. An index of a start beam in the TP 1 is 1, and a beam offset of a start beam in the TP 2 relative to the start beam in the TP 1 is 2. In this case, the index of the start beam in the TP 2 is a sum of the index of the start beam in the TP 1 and the beam offset. Therefore, the index of the start beam in the TP 2 is obtained as 3, and corresponds to a beam 3. A beam offset of the TP 3 relative to the TP 2 is 2, and an index of a start beam in the TP 3 is a sum of the index 3 of the start beam in the TP 2 and the beam offset 2. Therefore, the index of the start beam in the TP 3 is obtained as 5. Similarly, a modulo operation is used to obtain that the index of the beam in the TP 3 is 2.

Regardless of which of the foregoing methods is used, usually, it is assumed that a group of reference signals are transmitted on a group of beams, and a method for determining an index of a start beam in a $j^{th}$ time period relative to an index of a start beam in an $i^{th}$ time period is as follows. The terminal device may determine an index of a start beam according to the following method:

$w_j = \mod(w_i + K_j, N)$, where $w_j$ is the index of the start beam in the $j^{th}$ time period, $w_i$ is the index of the start beam in the $i^{th}$ time period, $K_j$ is a beam offset of the $j^{th}$ time period relative to the $i^{th}$ time period, and N is a quantity of beams included in the group of beams, where i and j are nonnegative integers.

The foregoing uses an index of a beam as an example. If the beam is identified by using a beam ID, the method is similar, and details are not described again.

In a possible implementation, the beam may alternatively be configured by using a QCL. In this case, QCL beam numbers configured in the first time period may be sequentially arranged to obtain a sequence number of each QCL beam number, and then a sequence number of each QCL beam number in each time period is calculated according to the foregoing method, to obtain a corresponding beam number based on a sequence number of a QCL beam number.

For example, the following table shows a correspondence between a QCL beam number and a sequence number.

TABLE 1

Correspondence between a QCL beam number and a sequence number

|  | Sequence number | | | | |
|---|---|---|---|---|---|
|  | 1 | 2 | 3 | 4 | 5 |
| QCL beam number | 3 | 4 | 2 | 3 | 0 |

If there are five time periods, an index of a start beam in a first time period is 2, a beam offset of a second time period relative to the first time period is 3, an index of a start beam in the second time period is obtained as 5 according to the foregoing method, and a QCL beam number corresponding to a sequence number 5 is obtained as 0 by querying Table 1. Herein, the QCL beam number is essentially an index or identifier of a QCL beam.

In a possible implementation, a sequence of beams in each time period is not necessarily continuous or sequentially numbered. For example, it is assumed that there are three beams. In a first time period, configured indexes of the beams are 1, 3, and 4. In other words, indexes or IDs of the beams are not continuous or sequentially numbered. In this case, the beams may be sorted according to a method similar to the foregoing QCL beam numbering method to obtain sequence numbers of the beams. Then the indexes or identifiers of the beams are determined based on the sequence numbers. A specific method is not described again.

In a possible implementation, the beam offset may be configured by the network device, may be obtained in a calculation manner, or may be obtained in a random sequence generation manner agreed in a protocol. For example, a pseudo-random sequence generator can be defined:

$$y(n)=c(n), \text{ where}$$

c is a pseudo-random generation formula, an initial condition is defined in a protocol or provided by the network device, and n is determined based on a number of one or more of a subframe, a slot, a periodicity, an occasion, a reference signal index (an ID or a location index in a set), an index of a reference signal set (or a set in which a reference signal resource is located), and the like. According to the pseudo-random sequence generator, $y(n)=0$ or 1 can be obtained. 0 corresponds to a time period 1, 1 represents a time period 2, and the like. It should be understood that a specific generation manner is not limited in this application. In this embodiment of this application, only that the beam offset may be obtained in another manner is described, and the beam offset is not necessarily configured by the network device.

In a possible implementation, beam rotation may not be performed in a sequence. For example, the network device may directly configure a rotation relationship. For example, the network device may configure a correspondence between a reference signal and an index or a number of a beam in each time period.

TABLE 2

Correspondence between a reference signal and an index of a beam

|  | Reference signal | | | |
|---|---|---|---|---|
|  | 1 | 2 | 3 | 4 |
| Index of a beam in the time period 1 | 1 | 2 | 3 | 4 |
| Index of a beam in the time period 2 | 4 | 2 | 3 | 1 |

It should be understood that a reference signal includes a mapping relationship between the reference signal and a reference signal resource corresponding to the reference signal. If the reference signal is determined, the reference signal resource corresponding to the reference signal is also determined. Details are not described herein again. The reference signal herein may alternatively be a number of a reference signal resource, and the reference signal is used as only an example herein. The reference signal herein may alternatively be a sequence number of a reference signal rather than an index or an identifier of the reference signal. The sequence number of the reference signal is obtained by numbering the index or the identifier of the reference signal. A method thereof is similar to the foregoing QCL beam numbering method, and a specific method is not described in detail again.

In a possible implementation, a quantity of reference signals and a quantity of beams may not be the same. For example, the quantity of reference signals is greater than the quantity of beams. In this case, a start beam in each time period may be determined according to a similar method, and a specific quantity of reference signals are selected, for transmission, from reference signals based on the start beam. For example, it is assumed that there are six reference signals and four beams. It is assumed that both reference signals and beams are numbered from 1, and a start beam in a time period 2 is numbered 2, and corresponds to a reference signal resource 4. In this case, the four beams in the time period 2 are numbered 2, 3, 4, and 1, respectively corresponding to reference signal resources 4, 5, 6, and 1.

Therefore, based on the foregoing determining the index of the start beam, a reference signal corresponding to a beam needs to be further determined. Assuming that a reference signal index corresponding to the start beam is $r_0$, a reference signal index corresponding to each beam may be determined according to the following formula:

$$r_i = \mod(r_0+i-1, R), \text{ where}$$

i represents an $i^{th}$ beam in a slot, $r_i$ represents a reference signal index of the $i^{th}$ beam, R represents a maximum quantity of reference signals, and mod represents a modulo operation.

The foregoing six reference signals and four beams are used as an example. It is assumed that the start beam in the time period 2 is numbered 2, and corresponds to a reference signal resource 4. In this case, an index of a second beam in the time period 2 is mod(4+2−1,6)=5. In other words, a reference signal index of a corresponding reference signal is 5.

Similarly, the reference signal index and/or the beam index may not be sequentially numbered. The reference signal index and/or the beam index may be numbered, to obtain a sequence number corresponding to the reference signal index and/or the beam index. The sequence number of the reference signal index and/or the beam index is obtained according to the foregoing method, to further obtain the reference signal index and/or the beam index corresponding to the sequence number. The method is the same as the QCL beam numbering method, and details are not described again.

In a possible implementation, beam rotation may be performed among different PRS sets of a same cell. In this case, the network device may configure a plurality of reference signal sets for the terminal device, and each reference signal set includes a plurality of reference signals. Optionally, PRSs in a same set use a same beam, and different PRS sets may correspond to different beams. In this case, reference signals of start beams in different time periods may correspond to reference signals in different reference signal sets. The method is similar. A difference is to determine different reference signal sets. After a reference signal set corresponding to the start beam is determined, reference signal sets corresponding to other beams are obtained according to a similar method. Details are not described again. Each beam may be used to determine a reference signal from a reference signal set in a pseudo-random manner or another manner. A specific method is not limited in this application.

In a possible implementation, a beam switching method may be used to implement interference randomization. As described above, beam switching refers to transmission of a reference signal on different beams in a time division manner. Usually, when there are relatively few reference signal resources, a plurality of beams cannot be simultaneously transmitted in a plurality of directions. Therefore, only some beams can be selected for transmission.

Figure 7:
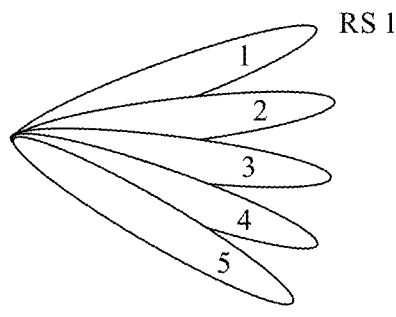
FIG. 7 is a schematic diagram of beam switching performed on one reference signal in two time periods according to an embodiment of this application.
Figure 7:
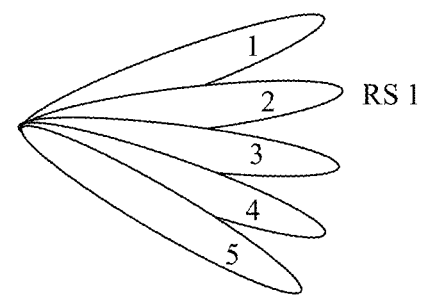

FIG. 7 is a schematic diagram of beam switching performed on one reference signal in two time periods. In a first time period, an RS 1 is transmitted on a beam 1, and in a second time period, the RS 1 is transmitted on a beam 2. From a perspective of the terminal device, it is assumed that the terminal device may receive both the beam 1 and the beam 2. However, considering that there is one reference signal resource, transmission can be performed between the beam 1 and the beam 2 only in a time division manner. Therefore, the terminal device may need to use different beams for reception in the first time period and the second time period. Therefore, beams appear to be switched.

According to the foregoing embodiment, reference signals transmitted on beams may be different in different time periods, so that continuous interference caused by reference signals conflicting with each other in a direction is avoided, and interference is randomized. This facilitates channel measurement, and improves measurement performance and accuracy.

Figure 8:
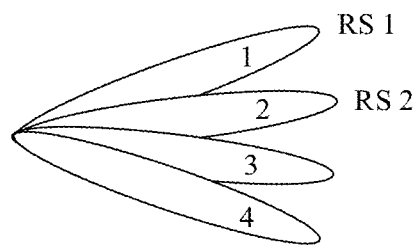
FIG. 8 is a schematic diagram of beam switching performed on a plurality of reference signals according to an embodiment of this application.
Figure 8:
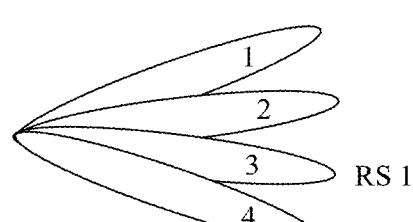

FIG. 8 is a schematic diagram of beam switching performed on two reference signals in two time periods. In FIG. 8, there are two reference signals, and transmission of four beams may be supported. In a first time period, an RS 1 is transmitted on a beam 1, and an RS 2 is transmitted on a beam 2. In a second time period, the RS 1 is transmitted on a beam 3, and the RS 2 is transmitted on a beam 4.

A method for configuring a beam for each reference signal is similar to the foregoing method. In other words, an index of a beam of each reference signal resource may be configured in different time periods. A difference lies in that an index of a beam is determined by using an index or an identifier of a reference signal resource, and an index of a beam corresponding to a reference signal resource in different time periods is determined by using a beam offset. For example, for the RS 1, if the beam offset is 2, and an index of a beam in the first time period is 1, an index of the beam in the second time period is 3.

When there are a plurality of reference signal resources, the reference signal resources may be sequentially sent based on a quantity of the reference signal resources. As shown in FIG. 8, in a first time period, an index of a beam corresponding to an RS 1 is 1, and an index of a beam corresponding to an RS 2 is 2. It is assumed that numbering is performed based on beam sequences corresponding to the reference signal resources RS 1 and RS 2. In this case, in a second time period, if an index of the beam corresponding to the RS 1 is determined to be 3, an index of the beam corresponding to the RS 2 may be determined to be 4.

In a possible implementation, the network device may configure a difference between indexes of beams corresponding to reference signal resources, and a corresponding index of a beam may be determined based on the difference between the indexes of the beams. For example, in FIG. 8, for the RS 1, a beam offset is 2, the index of the beam in the first time period is 1, and a difference between the index of the beam of the RS 2 and the index of the beam of the RS 1 in the second time period is 2. In this case, the index of the beam corresponding to the RS 2 may be determined as 1+2+2=5. Because there are only four beams in total, a modulo operation is performed on the result. Therefore, the index of the beam corresponding to the RS 2 in the second time period is mod(5,4)=1.

In a possible implementation, interference randomization may be alternatively performed in a mute mode. A conventional mute mode is to mute a reference signal according to a specific rule. Thus, in conventional mute mode, a mute beam is always unchanged.

Figure 9:
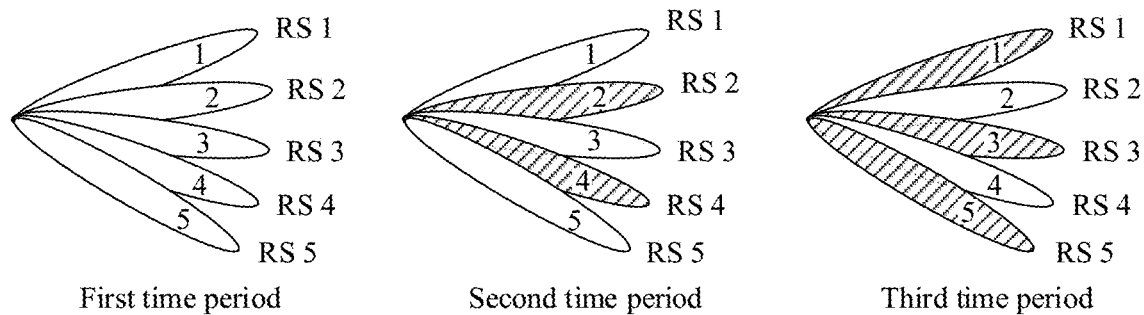
FIG. 9 shows a relationship between each time period and a reference signal in a mute mode according to an embodiment of this application.

FIG. 9 shows a relationship between each time period and a reference signal or a reference signal group in a mute mode. A shaded part in FIG. 9 represents a mute beam. In the figure, a relationship between a reference signal and a beam is fixed. A mute mode of each reference signal or beam in each time period is configured, so that interference randomization is implemented. In different time periods, transmitted beams are different.

The reference signal group may be a grouping of one or more reference signals. Reference signals in a same mute mode are grouped into one group, and the same mute mode is used. For example, reference signals in the reference signal group may be reference signals corresponding to a same cell or a same physical cell identifier (physical cell identifier, PCI), or may be directly configured by a base station. A specific grouping method is not limited in this application. Details are not described below again.

For example, in a first time period, from a perspective of the network device, a beam 1 to a beam 5 are all in a sending mode. In a second time period, the beams 2 and 4 are in a mute mode. In a third time period, the beam 1, the beam 3, and the beam 5 are in a mute mode.

Similar to the foregoing beam rotation method, a mute beam may be determined by using a beam offset. For example, a mute start beam in a time period may be determined by using a beam offset. Different from the foregoing beam rotation method, because mute beams may be discontinuous, the network device may further configure a mute beam spacing for the terminal device, and further determine other mute beams in a time period by using the mute beam spacing. For example, it is assumed that the mute beam spacing is 2 and the mute start beam is numbered 1, and mute beams may be obtained sequentially: the beam 1, the beam 3, and the beam 5. A quantity of mute beams does not exceed a maximum quantity of beams.

Another mute implementation method is: From a perspective of a network device, the network device configures a corresponding mute mode for each reference signal or reference signal group. The mute mode may be represented by using a binary bit string, and each bit indicates a mute status in a time period. For example, 1 indicates not mute, 0 indicates mute, and vice versa. A length of a bit may be equal to a mute cyclic periodicity. For example, [1, 0, 0] indicates that every three time periods are a mute periodicity.

The binary bit string of the mute mode may be alternatively obtained according to a calculation formula, and is used to indicate whether the reference signal or the reference signal group is mute in each time period. Specifically, a pseudo-random sequence generator can be defined:

$$y(n)=c(n), \text{ where}$$

c is a pseudo-random generation formula, an initial condition is defined in a protocol or provided by the network device, and n is determined based on a number of one or more of a subframe, a slot, a periodicity, an occasion (occasion), a reference signal index (an ID or a location index in a set), an index of a reference signal set (or a set in which a reference signal resource is located), and the like. According to the pseudo-random sequence generator, $y(n)=0$ or 1 can be obtained, and a specific meaning of the bit 0 or 1 is the same as that described above. A specific pseudo-random generation formula is not limited in this application.

If the mute mode is configured separately for each resource, configuration overheads and complexity are very high when a quantity of resources increases with a quantity of sites and beams. To reduce overheads, the network device may configure a mute mode list, where the list includes one or more mute modes. The network device may associate different reference signals or reference signal sets with one of the mute modes. For example, association of resources or resource sets with a mute mode ID or index is implemented through configuration, or association of resources or resource sets with a mute mode index is directly implemented by specifying calculation of $y(n)=c(n)$. For example, the calculation is similar to pseudo-random calculation performed in mute mode calculation, a modulo operation performed on a total quantity N of mute state items by using a resource index, or the like. A specific calculation manner is not limited in this application.

The foregoing mainly describes the solutions provided in the embodiments of this application from a perspective of interaction between network elements. It may be understood that, to implement the foregoing functions, the network elements such as the terminal device and the network device include a corresponding hardware structure and/or software module that are/is used to perform each function. A person of ordinary skill in the art should easily be aware that, in combination with the examples described in the embodiments disclosed in this specification, devices and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal device and the network device may be divided into functional modules according to the foregoing method examples. For example, division into each functional module may be performed, or two or more functions may be integrated into one processing module. The integrated module may be implemented in a form of hardware, or may be implemented in a form of a software functional module. It should be noted that, in the embodiments of this application, division into the modules is an example and is merely logical function division. During actual implementation, another division manner may be used. It should also be understood that, functional modules of the terminal device in this application do not include all functional modules of the terminal device, but include only functional modules related to this application. The network device may be a base station, a location management function, or a location measurement unit.

Figure 10:
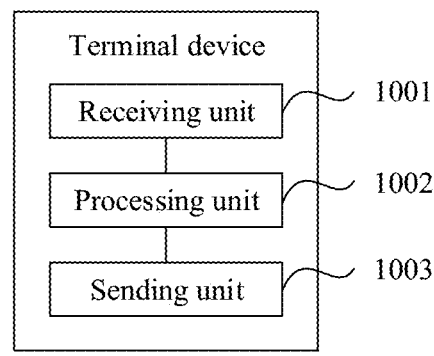
FIG. 10 is a possible schematic structural diagram of a terminal device according to an embodiment of this application.

FIG. 10 is a possible schematic structural diagram of a terminal device related in the foregoing embodiments according to this application. The terminal device is configured to perform the method performed by the terminal device in the foregoing method embodiments. Optionally, a specific form of the terminal device may be a terminal device or a chip in the terminal device. This is not limited in this embodiment of this application. The terminal device includes a receiving unit 1001. The receiving unit 1001 is configured to support the terminal device in performing S302, S304, and S305 in FIG. 3. The terminal device further includes a processing unit 1002, configured to support the terminal device in performing S303 and S305 in FIG. 2 and processing for receiving or sending a message, determining a start beam in each time period based on interference randomization configuration information, determining a beam of each reference signal in each time period, or the like. The terminal device further includes a sending unit 1003, configured to support the terminal device in sending an interference randomization configuration information response to the network device.

In terms of hardware implementation, the receiving unit 1001 may be a receiver, the sending unit 1003 may be a transmitter, and the receiver and the transmitter are integrated into a communication unit to form a communication interface.

Figure 11:
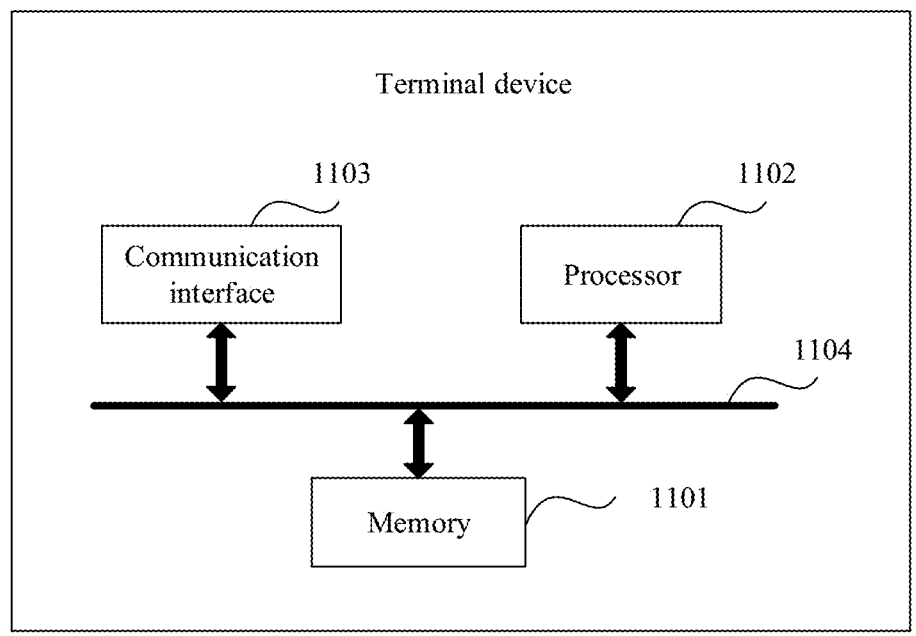
FIG. 11 is a possible schematic diagram of a logical structure of a terminal device according to an embodiment of this application.

FIG. 11 is a possible schematic diagram of a logical structure of a terminal device related in the foregoing embodiments according to an embodiment in this application. The terminal includes a processor 1102. In this embodiment of this application, the processor 1102 is configured to control and manage an action of the terminal device. For example, the processor 1102 is configured to support the terminal device in performing S302 and S305 in FIG. 3 and processing for receiving or sending a message in the foregoing embodiments, determining a start beam in each time period based on interference randomization configuration information, determining a beam of each reference signal in each time period, or the like. Optionally, the terminal device may further include a memory 1101 and/or a communication interface 1103. The processor 1102, the communication interface 1103, and the memory 1101 may be connected to each other or are connected to each other by using a bus 1104. The communication interface 1103 is configured to support the terminal in performing communication, and the memory 1101 is configured to store program code and data of the terminal. The processor 1102 invokes the code stored in the memory 1101 to perform control management. The memory 1101 may be coupled to or not coupled to the processor.

The processor 1102 and the memory 1101 may also be integrated in an application-specific integrated circuit, and the application-specific integrated circuit may further include the communication interface 1103. The application-specific integrated circuit may be a processing chip, or may be a processing circuit. The communication interface 1103 may be a communication interface that includes wireless receiving and sending, or may be an interface of a digital signal that is input after a received radio signal is processed by another processing circuit, or may be a software or hardware interface that communicates with another module.

In a possible design, the processor 1102, the memory 1101, and the communication interface 1103 may be implemented by using a chip. The processor 1102, the memory 1101, and the communication interface 1103 may be implemented on a same chip, or may be implemented on different chips, or a combination of any two functions is implemented in one chip.

The processor 1102 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1104 may be a peripheral component interconnect (Peripheral Component Interconnect) bus, an extended industry standard architecture (Extended Industry Standard Architecture, EISA) bus, or the like. The bus may be classified into an address bus, a data bus, a control bus, and the like.

Figure 12:
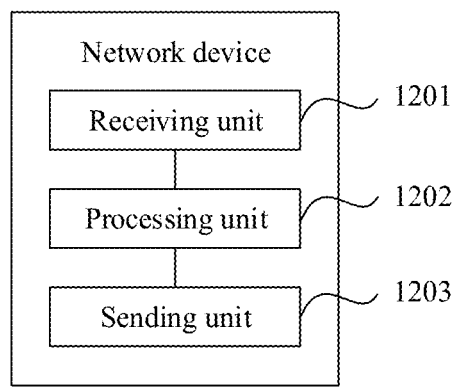
FIG. 12 is a possible schematic structural diagram of a network device according to an embodiment of this application.

FIG. 12 is a possible schematic structural diagram of a network device related in the foregoing embodiments according to this application. In this application, the network device may be a base station, a location management function, or a positioning measurement unit, and the base station includes a serving base station and/or a neighboring cell base station. The network device includes a sending unit 1203. The sending unit 1203 is configured to support the network device in performing S302 and S304 in FIG. 3.

The network device may further include a processing unit 1202, configured to support the network device in performing S301 in FIG. 3 and processing of receiving and/or sending a message by the network device in the foregoing method embodiments, determining a spacing between beams in each time period, and the like.

The network device may further include a receiving unit 1201, configured to support the network device in receiving an interference randomization configuration information response sent by the terminal device.

In terms of hardware implementation, the sending unit 1203 may be a transmitter, the receiving unit 1201 may be a receiver, and the receiver and the transmitter are integrated into a communication unit to form a communication interface.

Figure 13:
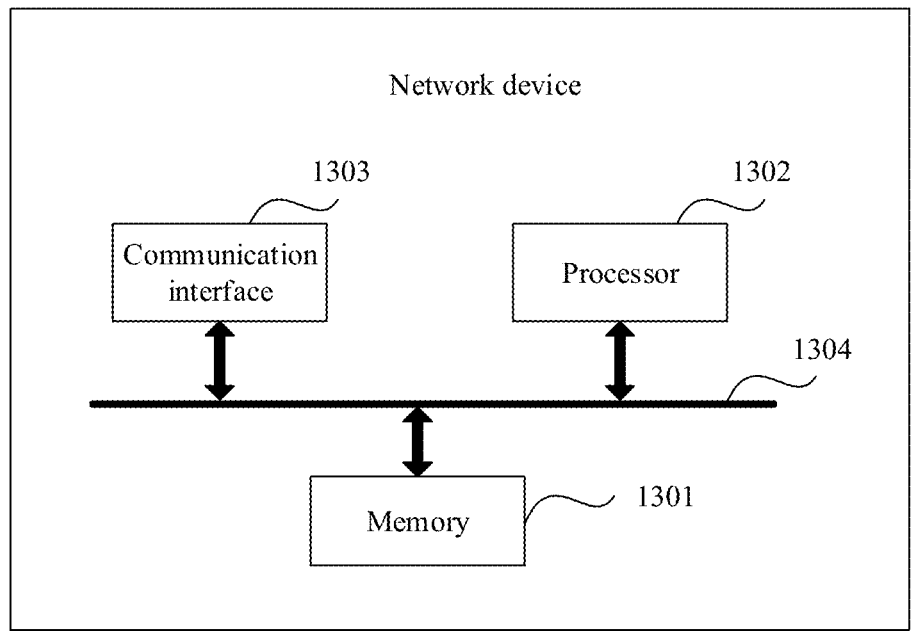
FIG. 13 is a possible schematic diagram of a logical structure of a network device according to an embodiment of this application.

FIG. 13 is a possible schematic diagram of a logical structure of a network device related in the foregoing embodiments according to an embodiment in this application. The network device includes a processor 1302. In this embodiment of this application, the processor 1302 is configured to control and manage an action of the network device. For example, the processor 1302 is configured to support the network device in processing various messages performed by the receiving unit 1201, the sending unit 1203, and the processing unit 1202 in the foregoing embodiments, determining interference randomization configuration information, determining a start beam in each time period, and the like.

Optionally, the network device may further include a memory 1301 and/or a communication interface 1303. The processor 1302, the communication interface 1303, and the memory 1301 may be connected to each other or are connected to each other by using a bus 1304. The communication interface 1303 is configured to support the network device in performing communication, and the memory 1301 is configured to store program code and data of the network device. The processor 1302 invokes the code stored in the memory 1301 to perform control management. The memory 1301 may be coupled to or not coupled to the processor.

The processor 1302 and the memory 1301 may also be integrated in an application-specific integrated circuit, and the application-specific integrated circuit may further include the communication interface 1303. The application-specific integrated circuit may be a processing chip, or may be a processing circuit. The communication interface 1303 may be a communication interface that includes wireless receiving and sending, or may be an interface of a digital signal that is input after a received radio signal is processed by another processing circuit, or may be a software or hardware interface that communicates with another module.

In a possible design, the processor 1302, the memory 1301, and the communication interface 1303 may be implemented by using a chip. The processor 1302, the memory 1301, and the communication interface 1303 may be implemented on a same chip, or may be implemented on different chips, or a combination of any two functions is implemented in one chip.

The processor 1302 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1304 may be a peripheral component interconnect (Peripheral Component Interconnect) bus, an extended industry standard architecture (Extended Industry Standard Architecture, EISA) bus, or the like. The bus may be classified into an address bus, a data bus, a control bus, and the like.

In another embodiment of this application, a readable storage medium is further provided. The readable storage medium stores computer-executable instructions. When a device (which may be a single chip microcomputer, a chip, or the like) or when the processor performs the methods described in FIG. 3, FIG. 4, FIG. 5, FIG. 6, FIG. 7, FIG. 8, and FIG. 9, the computer-executable instructions in the storage medium are read. The foregoing readable storage medium may include: any medium that can store program code, such as a USB flash drive, a removable hard disk, a read-only memory, a random access memory, a magnetic disk, or an optical disc. The storage medium may store instructions operated by the terminal device in the foregoing embodiments and/or instructions operated by the network device in the foregoing embodiments.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions, so that the device performs steps or methods performed by the terminal device and the network device in the interference randomization methods provided in FIG. 2 to FIG. 9.

In another embodiment of this application, a communication system is further provided. The communication system at least includes one terminal device and includes at least one network device. The network device includes a serving base station, a neighboring base station, a location management function, or a location measurement unit. The terminal device may be the terminal device provided in FIG. 10 or FIG. 11, and is configured to perform steps or methods of the terminal device in the interference randomization methods provided in FIG. 3 to FIG. 9, and/or the network device may be the network device provided in FIG. 12 or FIG. 13, and is configured to perform steps or methods performed by the network device in the interference randomization methods provided in FIG. 3 to FIG. 9. It should be understood that the communication system may include a plurality of terminal devices and a plurality of network devices, and the terminal device may simultaneously measure reference signals sent by the plurality of network devices.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In this embodiment of this application, the terminal device dynamically changes beam transmission in a beam rotation mode, a mute mode, or a beam switching mode by receiving interference randomization configuration information sent by the network device. According to the foregoing method, transmission of the reference signal in each direction may be randomized, to avoid continuous interference generated by the reference signal in a specific direction.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A terminal device, comprising:
a receiver, configured to receive interference randomization configuration information, wherein
the interference randomization configuration information comprises, for at least two time periods, different receiving modes of a reference signal in the at least two time periods, and
each of the receiving modes indicates a manner in which the reference signal, being a downlink reference signal, is received at the terminal device on a reference signal resource or a reference signal resource set, wherein
the receiver is further configured to receive the reference signal based on the interference randomization configuration information, and
a receiving mode of the receiving modes comprises:
a mute mode, in which
in a first time period among the at least two time periods, the reference signal is sent by a first beam in a set of beams, and
in a second time period among the at least two time periods, the first beam is mute and the reference signal is not sent, while a further reference signal is sent by a second beam in the set of beams, the second beam different from the first beam, or
a rotation mode, in which
in the first time period among the at least two time periods, a set of reference signals including the reference signal is associated with, and sent by, the set of beams in a first correspondence between the set of reference signals and the set of beams, and
in the second time period among the at least two time periods, the set of reference signals is associated with, and sent by, the set of beams in a second correspondence between the set of reference signals and the set of beams, the second correspondence different from the first correspondence.

2. The terminal device according to claim 1, wherein the interference randomization configuration information further comprises at least one of:
an index of a start beam in a first time period among the at least two time periods, or
a receiving mode indication.

3. The terminal device according to claim 1, wherein the interference randomization configuration information further comprises a beam offset, and
the beam offset indicates
an offset of a start beam in each time period among the at least two time periods relative to a start beam in a first time period among the at least two time periods, or
an offset of a start beam in a subsequent time period among the at least two time periods relative to a start beam in a previous time period among the at least two time periods.

4. The terminal device according to claim 3, further comprising:
a processor, configured to determine a start beam of a group of beams in each time period among the at least two time periods, based on the beam offset.

5. The terminal device according to claim 4, wherein the processor is further configured to determine a start beam according to the following method:
$w_j = \mod(w_i + K_j, N)$, where $w_j$ is an index of a start beam in a $j^{th}$ time period, $w_i$ is an index of a start beam in an $i^{th}$ time period, $K_j$ is a beam offset of the $j^{th}$ time period relative to the $i^{th}$ time period, and N is a quantity of beams in the group of beams, wherein i and j are nonnegative integers.

6. The terminal device according to claim 1, wherein a further receiving mode of the receiving modes comprises:
   a switching mode, in which
      in the first time period among the at least two time periods, the reference signal is sent by the first beam in the set of beams, and
      in the second time period among the at least two time periods, the reference signal is sent by the second beam in the set of beams.

7. The terminal device according to claim 1, wherein in the rotation mode,
   in the first time period, the reference signal is sent by the first beam in the set of beams, while the further reference signal is sent by the second beam in the set of beams, and
   in the second time period, the reference signal is sent by the second beam, while the further reference signal is sent by the first beam or a third beam in the set of beams, the third beam different from the first beam and the second beam.

8. The terminal device according to claim 1, wherein the at least two time periods further comprises a third time period different from the first time period and the second time period,
   the set of beams further comprises a third beam different from the first beam and the second beam, and
   in the mute mode,
      in the first time period, the reference signal is sent by the first beam, the further reference signal is sent by the second beam, and another reference signal is sent by the third beam,
      in the second time period, the first beam is mute, the further reference signal is sent by the second beam, and the another reference signal is sent by the third beam, and
      in the third time period, the reference signal is sent by the first beam, and the second beam and the third beam are mute.

9. A network device, comprising:
   a transmitter, configured to send interference randomization configuration information to a terminal device, wherein
      the interference randomization configuration information comprises, for at least two time periods, different receiving modes of a reference signal in the at least two time periods, and
      each of the receiving modes indicates a manner in which the reference signal, being a downlink reference signal, is sent to the terminal device on a group of beams, wherein
   the transmitter is further configured to send the reference signal based on the interference randomization configuration information, and
   a receiving mode of the receiving modes comprises:
      a rotation mode, in which
         in a first time period among the at least two time periods, a set of reference signals including the reference signal is associated with, and sent by, a set of beams in a first correspondence between the set of reference signals and the set of beams, and
         in a second time period among the at least two time periods, the set of reference signals is associated with, and sent by, the set of beams in a second correspondence between the set of reference signals and the set of beams, the second correspondence different from the first correspondence.

10. The network device according to claim 9, wherein the interference randomization configuration information further comprises at least one of:
   an index of a start beam in a first time period among the at least two time periods, or
   a receiving mode indication.

11. The network device according to claim 9, wherein the interference randomization configuration information further comprises a beam offset, and
   the beam offset indicates
      an offset of a start beam in each time period among the at least two time periods relative to a start beam in a first time period among the at least two time periods, or
      an offset of a start beam in a subsequent time period among the at least two time periods relative to a start beam in a previous time period among the at least two time periods.

12. The network device according to claim 11, comprising:
   a processor, configured to determine a start beam of the group of beams in each time period among the at least two time periods, based on the beam offset.

13. The network device according to claim 12, wherein the processor is further configured to determine a start beam according to the following method:
   $w_j = \mod(w_i + K_j, N)$, where $w_j$ is an index of a start beam in a $j^{th}$ time period, $w_i$ is an index of a start beam in an $i^{th}$ time period, $K_j$ is an offset of the start beam in the $j^{th}$ time period, and N is a quantity of beams in the group of beams, wherein i and j are nonnegative integers.

14. The network device according to claim 9, wherein a further receiving mode of the receiving modes comprises:
   a mute mode, in which
      in the first time period among the at least two time periods, the reference signal is sent by a first beam in the set of beams, and
      in the second time period among the at least two time periods, the first beam is mute and the reference signal is not sent, while a further reference signal is sent by a second beam in the set of beams, the second beam different from the first beam, or
   a switching mode, in which
      in the first time period among the at least two time periods, the reference signal is sent by the first beam in the set of beams, and
      in the second time period among the at least two time periods, the reference signal is sent by the second beam in the set of beams.

15. An interference randomization method, comprising:
   receiving, by a terminal device, interference randomization configuration information, wherein
      the interference randomization configuration information comprises, for at least two time periods, different receiving modes of a reference signal in the at least two time periods, and
      each of the receiving modes indicates a manner in which the reference signal, being a downlink reference signal, is received at the terminal device on a reference signal resource or a reference signal resource set; and
   receiving, by the terminal device, the reference signal based on the interference randomization configuration information,
   wherein a receiving mode of the receiving modes comprises:

a mute mode, in which
- in a first time period among the at least two time periods, the reference signal is sent by a first beam in a set of beams, and
- in a second time period among the at least two time periods, the first beam is mute and the reference signal is not sent, while a further reference signal is sent by a second beam in the set of beams, the second beam different from the first beam.

16. The method according to claim 15, wherein the interference randomization configuration information further comprises at least one of:
- an index of a start beam in a first time period among the at least two time periods, or
- a receiving mode indication.

17. The method according to claim 15, wherein the interference randomization configuration information further comprises a beam offset, and
the beam offset indicates
- an offset of a start beam in each time period among the at least two time periods relative to a start beam in a first time period among the at least two time periods, or
- an offset of a start beam in a subsequent time period among the at least two time periods relative to a start beam in a previous time period among the at least two time periods.

18. The method according to claim 17, further comprising:
determining, by the terminal device, a start beam of a group of beams in each time period among the at least two time periods, based on the beam offset.

19. The method according to claim 18, wherein the determining the start beam of the group of beams in each time period among the at least two time periods comprises:
determining, by the terminal device, the start beam according to the following method:
$w_j = \mod(w_i + K_j, N)$, where $w_j$ is an index of a start beam in a $j^{th}$ time period, $w_i$ is an index of a start beam in an $i^{th}$ time period, $K_j$ is a beam offset of the $j^{th}$ time period relative to the $i^{th}$ time period, and N is a quantity of beams in the group of beams, wherein i and j are nonnegative integers.

20. The method according to claim 15, wherein
a further receiving mode of the receiving modes comprises:
a rotation mode, in which
- in the first time period among the at least two time periods, a set of reference signals including the reference signal is associated with, and sent by, the set of beams in a first correspondence between the set of reference signals and the set of beams, and
- in the second time period among the at least two time periods, the set of reference signals is associated with, and sent by, the set of beams in a second correspondence between the set of reference signals and the set of beams, the second correspondence different from the first correspondence, or
a switching mode, in which
- in the first time period among the at least two time periods, the reference signal is sent by the first beam in the set of beams, and
- in the second time period among the at least two time periods, the reference signal is sent by the second beam in the set of beams.

* * * * *